(12) United States Patent
Telchuk

(10) Patent No.: US 6,682,654 B1
(45) Date of Patent: Jan. 27, 2004

(54) SLUDGE RECOVERY APPARATUS AND METHOD

(76) Inventor: Steve E. Telchuk, 19233 Tahoe, Mundelein, IL (US) 60060

( * ) Notice: Subject to any disclaimer, the term of this patent is extended or adjusted under 35 U.S.C. 154(b) by 336 days.

(21) Appl. No.: 09/637,303

(22) Filed: Aug. 11, 2000

(51) Int. Cl.[7] .................. B01D 21/24; B01D 21/34; C02F 1/24
(52) U.S. Cl. .................. 210/703; 210/744; 210/776; 210/804; 210/122; 210/123; 210/127; 210/128; 210/167
(58) Field of Search .................. 210/167, 123, 210/124, 126, 127, 128, 744, 776, 194, 703, 122, 804

(56) References Cited

U.S. PATENT DOCUMENTS

| | | | |
|---|---|---|---|
| 4,102,303 A | * | 7/1978 | Cordier et al. |
| 4,367,148 A | * | 1/1983 | Fulton et al. |
| 4,563,274 A | * | 1/1986 | Rothon et al. |
| 4,585,557 A | * | 4/1986 | Turnquist |
| 4,610,785 A | * | 9/1986 | Russell |
| 4,818,388 A | * | 4/1989 | Morioka et al. |
| 4,867,872 A | * | 9/1989 | Russell et al. |
| 5,372,711 A | * | 12/1994 | Sill |
| 5,378,376 A | * | 1/1995 | Zenner |

FOREIGN PATENT DOCUMENTS

JP      62-097689      * 5/1987

* cited by examiner

Primary Examiner—Thomas M. Lithgow
(74) Attorney, Agent, or Firm—Pyle & Piontek

(57) ABSTRACT

A paint spray booth sludge recovery system, apparatus and method is provided for water washed paint spray booths. The spray booths are used with a tank or pit which can accommodate flotation for removal of spent paint. Preferably, the tank has a drop box section, a chemical treatment section, a weir box section and a booth recirculation pump section. A series of weirs are used to separate the spent paint and send a concentration thereof from the weir box to a separator or centrifuge. The water level in the system is controlled by sensing the weir box water level to keep the water crests over the weirs at the desired levels. Scavenging and agitation are provided in the tank to keep it entirely clean for prolonged periods without any accumulation, even during downtime.

32 Claims, 8 Drawing Sheets

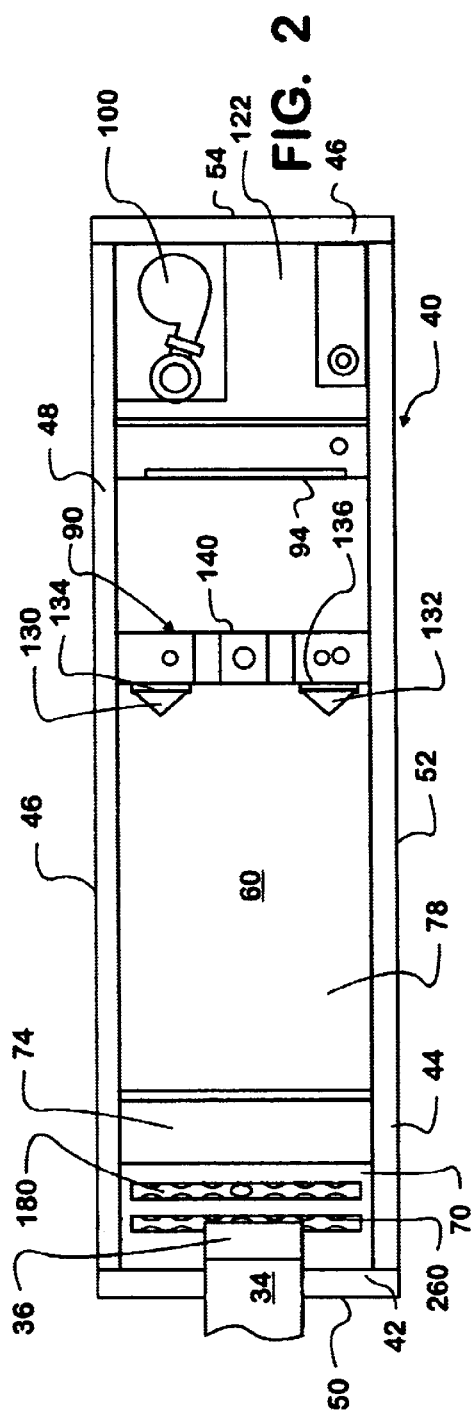
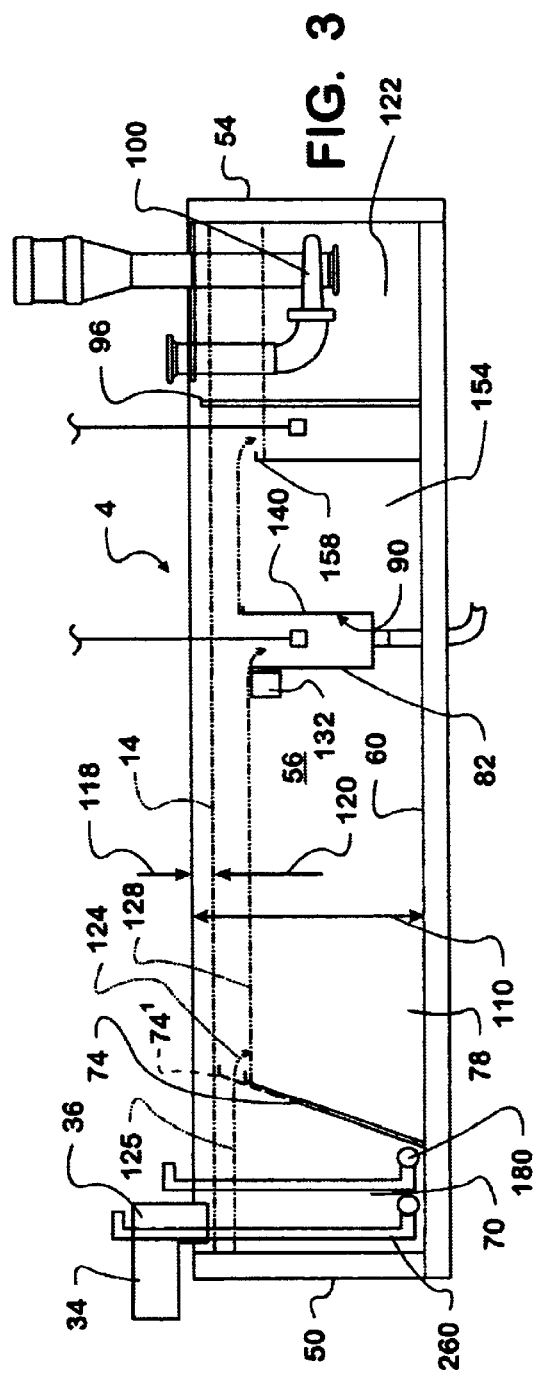

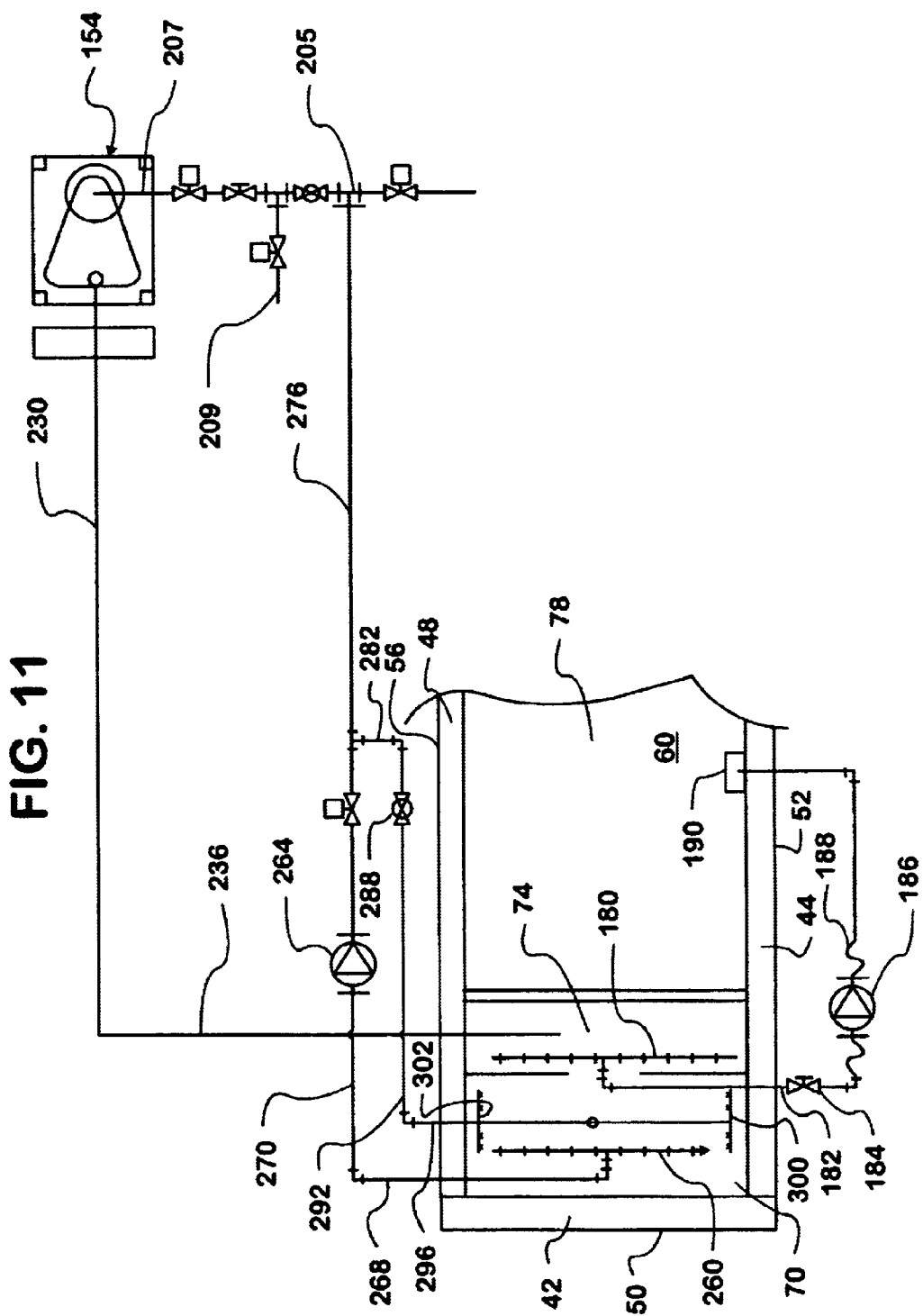

SLUDGE RECOVERY APPARATUS AND METHOD

DISCLOSURE

This invention relates to paint spray booths and paint or sludge recovery systems and method for such booth, and more particularly, to water washed booths that utilize one or more weirs and a solids separator.

BACKGROUND OF THE INVENTION

Heretofore, water washed paint spray booths have utilized sludge recovery systems to separate the spent paint material picked up by the water as it passed through the booth. In one type system, the water carrying the spent paint is allowed to drop or flow out of the booth into a recovery tank or pit. In the tank or pit, the water is treated with chemicals, such as flotation chemicals which assists the spent paint material to separate or segregate, and, in this instance, float to the top. After sufficient time for the separating or flotation action to occur, the spent paint material floats to the top and is allowed to flow over a weir into a separation area wherein it can be concentrated. From there, the concentration spent paint material is drawn off to a centrifuge which separates the spent paint from the remaining water, and the remaining water is sent back and is reused in booth.

During the operation of the booth, and even during downtime, water in the booth system tends to be reduced in quantity, either due to evaporation, water being blown out the booth eliminator section (the booth having a motor driven fan to usually exhaust air, including some water out of the booth) and just variations in operating conditions. The latter could be due to a single pit or tank serving more than one booth and one or more booths operating conditions being changed or shut down. Changes in both water quantity and consequently the water level and the sludge recovery can have adverse consequences, particularly on the operations of sludge systems using weirs. For example, changes of water level effects the water crests flowing over the weirs and their operation. Too large a water crest can cause excess water to be supplied to the separator making it more difficult to extract the sludge efficiently. Too little water in the crests, on the other hand, can cause hang ups of the sludge, and partial or complete blockages, and also reduces the efficiency of the operation. Keeping a constant water level in the tank is important as it helps keep weirs operating consistently. Heretofore, one attempt to do so was to try to use a float controlling the make up water valve in the large pit in which the chemical action or flotation action takes place. While this system worked, it was slow to react to changes and allowed considerable variation in water level in other portions of the system. Due to the difficulty in controlling the water level in such way, it was difficult to get consistent efficient operation of a system based on paint sludge flotation and some times other systems were used such as sinking or suspension, that is, causing the spent paint to first sink, be drawn off the bottom or to be kept in suspension and just drawn off. Prior to the present invention, there was not a reliable way to maintain water level efficiently and permit the use of spent paint flotation and weirs.

SUMMARY OF THE INVENTION

The present invention provides structure or means and a method to better maintain the water level in a paint spray booth sludge recovery system to make the use of flotation and weirs highly efficient.

In the improved system, the water level is not measured in the large tank or pit of the chemicals section, but is instead measured downstream, preferably, in a weir box having an entrance weir into which the water flows after the spent paint is treated and concentrated and/or separated by flowing over this entrance weir. The invention provides excellent control of the water level in the tank and a rapid response to a change in water may provide make up water. In the present invention, water and dispersed spent paint is taken out from the weir box to flow to the solids separation device, in this instance, a centrifuge where the sludge is essentially separated from the water. The sludge-free water is first passed through screens and sent back to the booth pumps that provide the water circulation (recirculation) for the booth for reuse.

Another improvement is the provision of an agitation system within the weir box to keep the water and any spent paint material agitated so that the spent paint does not settle out. This agitation water flow from the weir box may be provided by a pump that returns water to the weir box to keep it agitated.

Another improvement is the provision of a sludge withdrawal system which may utilize a separate pump to pick up water and sludge at the bottom of a drop tank into which the booth first discharges the water and spent paint, before the first weir. The material from the sludge withdrawal system is then discharged into a basket or screened area in the pit or tank to trap large sized spent paint material or sludge, but let the water escape. If desired, the drop tank too may be provided with means for agitating the spent paint and water therein.

Additionally, a maintenance cycle may be provided with means for withdrawing water and solids from any desired portion of the booth or tank and returning cleaned water to the system. Preferably, this action occurs in the tank before the first weir or drop section to keep it clean.

The entire operation of the booth tank and sludge removal system may be automatically controlled either by a central processor or a PLC (Programmable Logic Controller).

OBJECTS OF THE PRESENT INVENTION

It is an object of the present invention to provide a spray booth sludge recovery system which is maintenance free and keeps not only the booth but also sludge system, itself, clean.

Another object of the present invention is to closely control the water quantity in the booth sludge recovery system.

Still another object of the present invention is to closely monitor the water level in the sludge recovery system so that a flotation spent paint recovery system works well.

A further advantage of the present invention is to closely monitor the water level to maintain consistent water crests over a weir.

Yet a further object of the present invention is to maintain consistent flowage over the sludge collection weir.

Yet another further object of the present invention is in providing agitation in the weir box and/or elsewhere in the system to increase centrifuge efficiency and keep the weir box and/or other portions of the system clean.

Still a further object is to provide scavenging early in the sludge recovery system to remove large clumps, particularly before reaching the chemicals treatment section of the booth.

Still yet a further object is to provide a means for a maintenance cycle whereby the booth, tank and/or sludge removal system is cleaned during downtime.

These and other objects of the present invention will become apparent from the following written description and the accompanying drawing.

BRIEF DESCRIPTION OF THE DRAWINGS

FIG. 2 is an enlarged schematic plan view of the tank shown in FIG. 1.

FIG. 3 is a schematic elevational view of the tank shown in FIG. 2.

FIG. 11 is a view similar to FIG. 7, but showing additional means for agitating the drop box.

DESCRIPTION OF THE PREFERRED EMBODIMENTS

Figure 1:
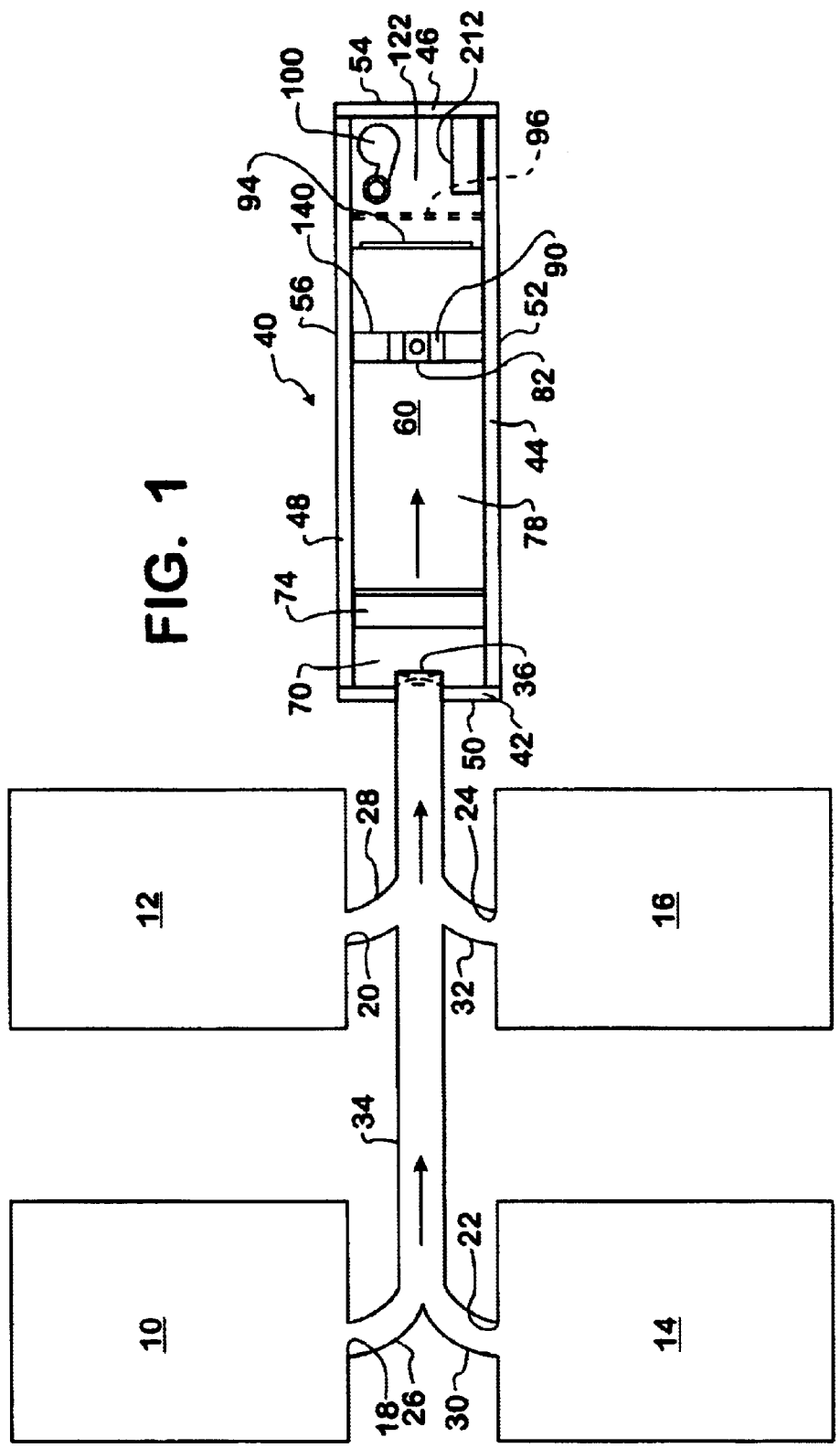
FIG. 1 is a schematic plan view of the present invention showing a plurality of paint spray booths serviced by a single sludge recovery pit or tank.
Figure 4:
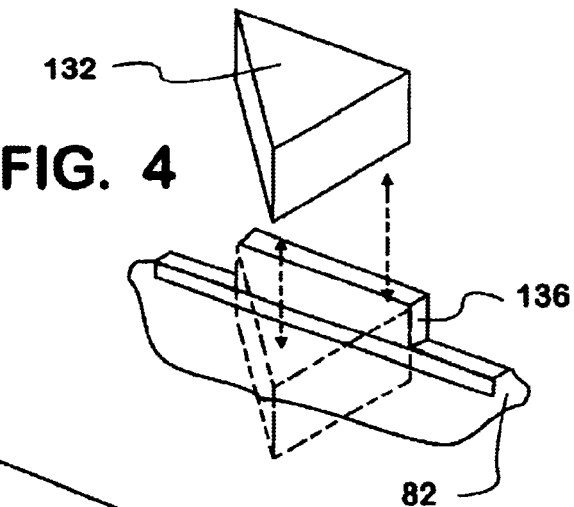
FIG. 4 is an enlarged schematic perspective view of the adjustable, flotation concentration baffles shown in the tank of FIG. 2.

Referring to FIG. 1, a plurality, in this instance, four water washed spray paint booths 10, 12, 14 and 16 are shown. As is conventional, water is used in the booths to collect spent paint and to wash the air being discharged by the booths. The booths are generally provided with a motor driven exhaust fan and eliminating means to move the air through the booth, collect the paint and remove it from the exhausted air. Each booth discharges its wash water and spent paint from a discharge opening 18, 20, 22 and 24 into first branch troughs or pipes 26, 28, 30 and 32, and a common trough on pipe 34. The trough on pipe 34 has a discharge end 36. From end 36 the spent paint and water flows into a sludge removal or treatment pit or tank 40. The tank 40 could be from 5 to 15 feet wide and 20 to 100 feet long and 4 to 10 feet high. For example, a tank 40 could be 5 feet wide, 24 feet long and 6 feet high. The tank or pit has a top rim with four parts 42, 44, 46 and 48; there are also sidewalls 50, 52, 54 and 56, and a bottom wall 60 to confine the water and spent paint in the tank 40 for treatment.

Figure 7:
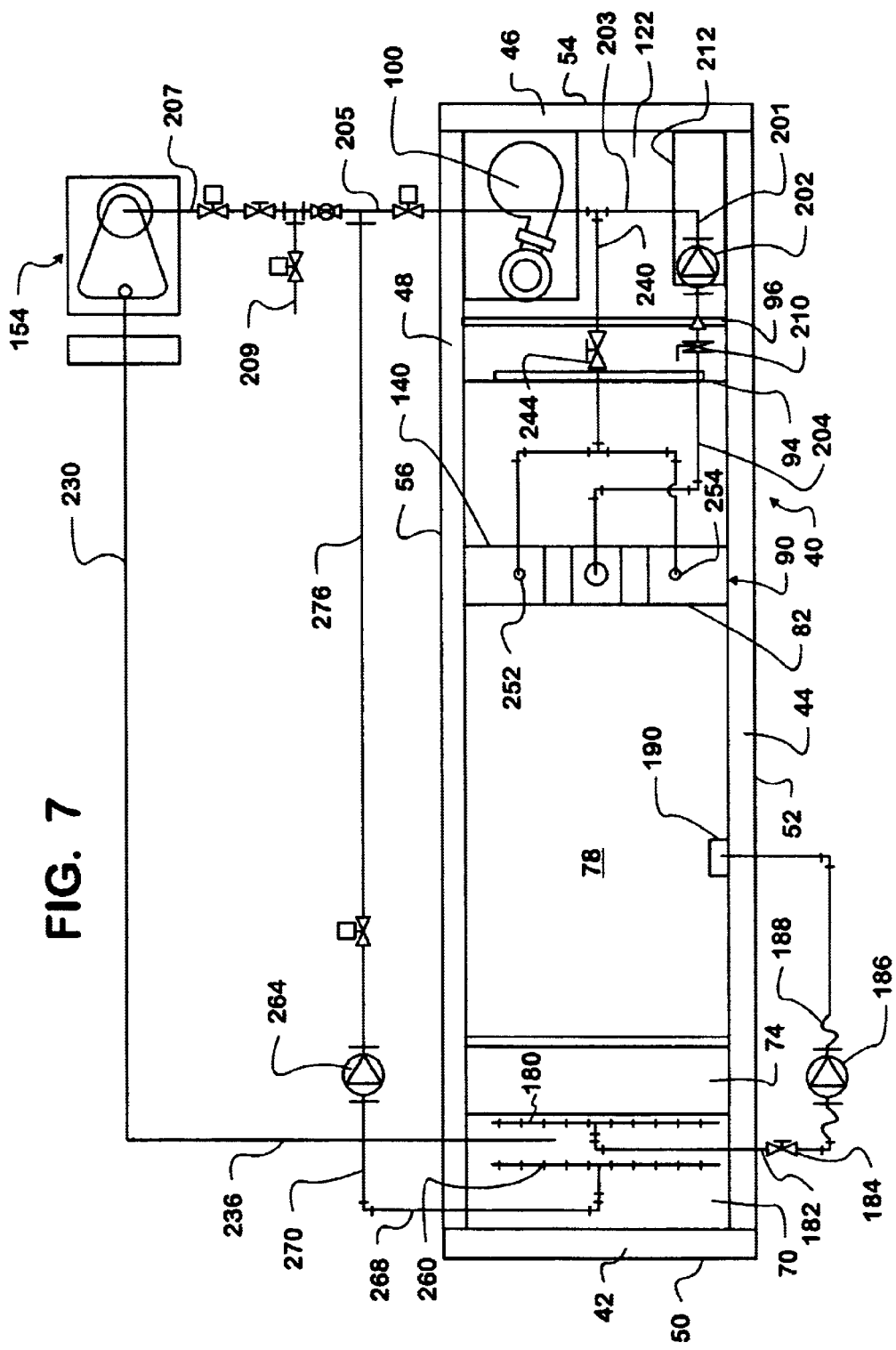
FIG. 7 is an enlarged schematic plan view of the tank of FIG. 2, showing the pipe and other system components and connections.
Figure 8:
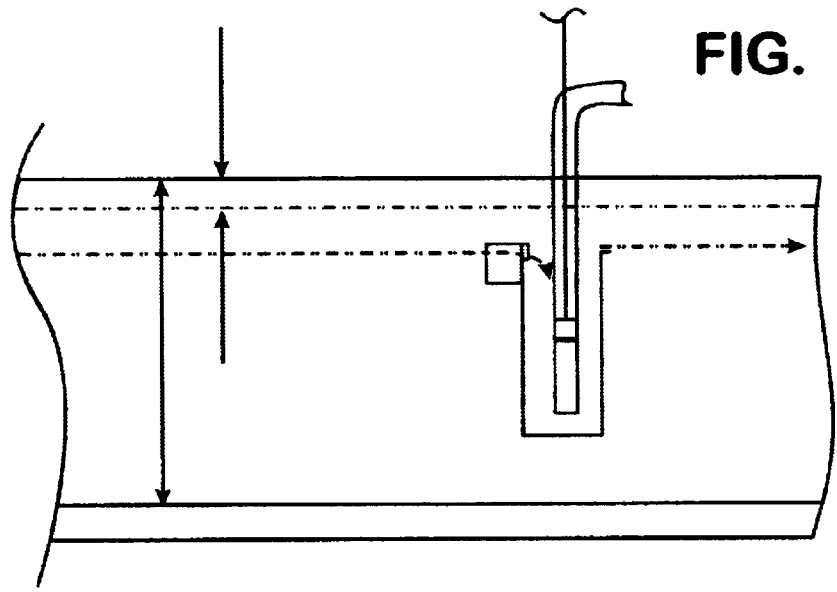
FIG. 8 is an elevational view of the tank of FIGS. 2 and 6 showing water levels at various times.
Figure 9:
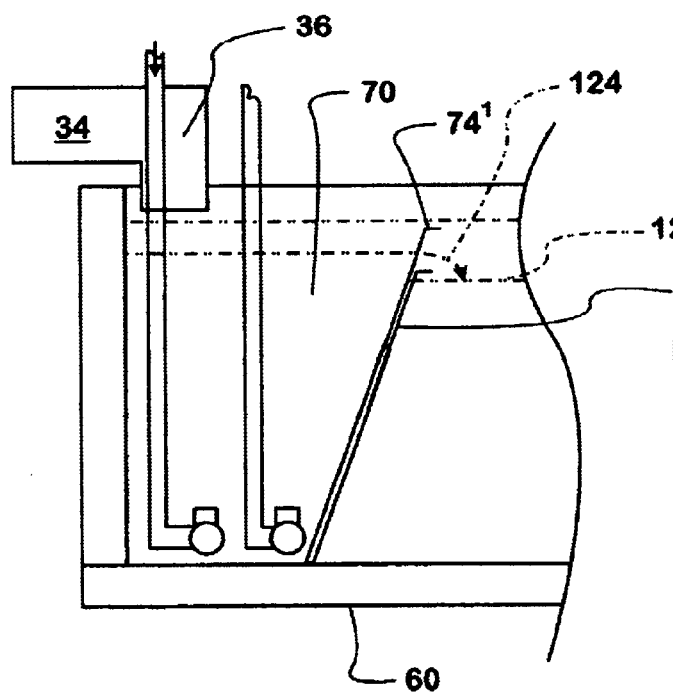
FIG. 9 is an elevational view of the upstream drop box into which the booths first discharge the spent paint and water into the tank.
Figure 10:
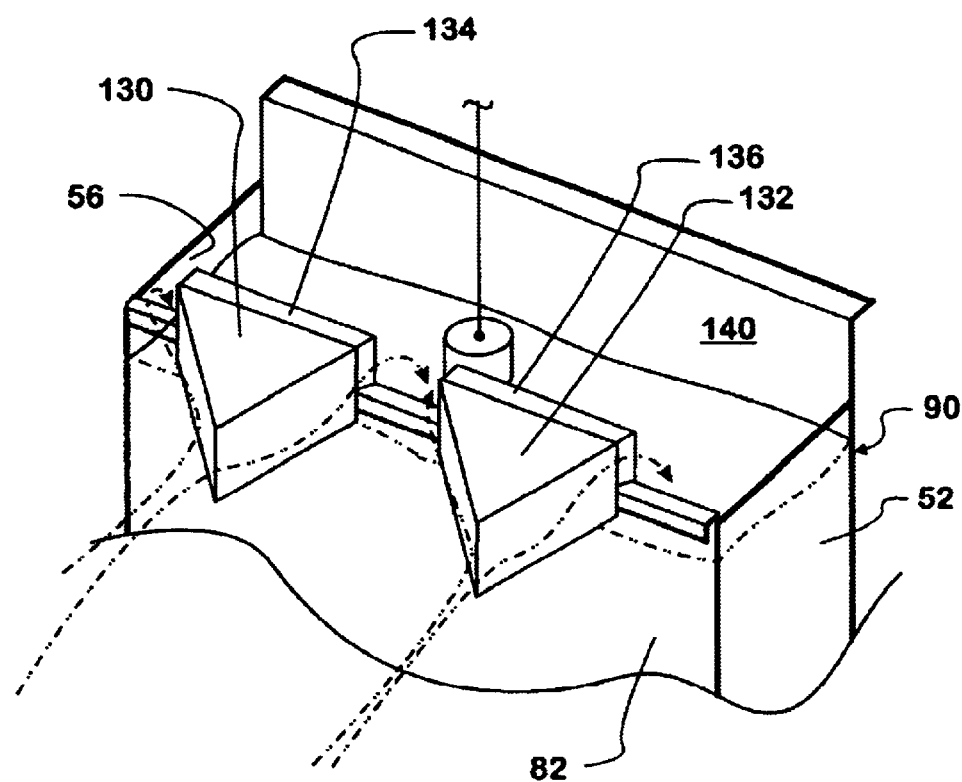
FIG. 10 is a view somewhat similar to FIG. 5 or 6 but showing how the water and floating spent paint are concentrated as they flow past the baffles, over the weir, and into the weir box.

The tank 40 preferably has several sections. These sections will be briefly described here and in more detail later. The first section will be called the drop box section 70. It is into this section that the wash water and spent paint from the booths first drops or flow. A vertical drop of several feet or more is desired for the agitation air entrainment, and to help break up of larger sludge pieces or matter. Separating the drop box from the other downstream portions or sections of the tank, is a first baffle, preferably in the form of a first weir 74 although water flows over the first weir. Downstream of the first weir 74 is the chemical treatment section 78 wherein the chemically treated water is caused to interact with the spent paint. From the chemical treatment section 78, some of the water at the top surface of the tank, now due to the treatment carrying most of the spent paint, flows over a second baffle or weir 82 into a weir box portion or section 90. The remainder of the water flowing from the chemical section 78, which is generally much freer of spent paint flows down below the weir box 90, over a third baffle or weir 94, through a screens 96 to be drawn into the main supply pump 100 or pumps for the booth or booths (10, 12, 14 and 16) to be recirculated by the pump for reuse to maintain the water wash in the booths. The portion of the water and spent paint that has gone into the weir box 90, will be, as is subsequently discussed, further cleaned and treated by a centrifuge (see FIG. 7) to separate out almost all, over 99% of the spent paint.

Referring now to FIGS. 2 and 3, much of the steps and structure just described can be seen in more detail. Further additional structure is shown in these figures and will now be described along with their function and operation. The depth of the tank is shown as represented by the arrow 110 and could be from 36 to 120 inches with about 60–96 inches being preferred. The maximum water level that might be held in the tank, such as during downtime is represented by the broken line 114. The arrows 118 and 120 indicate the distance that the maximum water level is below the tank walls, which might be 12 inches. As noted above, in addition to the first and second weirs 74 and 82, the third weir 94 may be provided between the downstream side of the weir box and the pump well portion or section 122.

In operation, water and spent paint flow from the discharge 36 into the drop tank section 70, and all water and spent paint must flow over the top edge of the first weir 74 into the treatment section 78.

The length of the chemical treatment section 78 is made long enough so that, depending on the chemicals and paint used, they have sufficient time to react to provide the desired action to the spent paint. This could be a time period as quick as a few seconds or minutes, with the latter being preferred to ensure full treatment. In the preferred instance, the chemicals cause the spent paint to float. Other type paints and chemicals could be used, such as those causing sinking or suspension, but such would require changes in the scavenging structure and operation to accommodate such different systems. The flow of water from the drop tank 70 over the first weir 74 causes a crest to form and flow over the weir as indicated at 124. As can be seen, the water level, when operating, in the chemical treatment section is below the water level 125 of the drop tank section, as indicated by the dotted line 128. As is indicated by the dotted line 74', the baffle 74 may be adjusted in height to help control or provide a desired height or depth of water behind the baffle 74 (or 74') as is desired or needed to form the desired height water crest over weir 74. The adjustment can be accomplished in various manners.

As is better shown in FIGS. 2, 3, 4 and 5, some of the water discharged from the chemical treatment section 70 flows over the second weir 82, but before doing so, the floating spent paint material is concentrated toward the center (plan view) of the tank's top surface by a pair of concentration baffles 130 and 132. The baffles, preferably, have a somewhat triangular shape (top view) and tend to cause or concentrate the spent paint material toward the center of the tank (in a plan view). Like the first weir 74, the concentrating baffles 130 and 132 are adjustable and can be moved in toward and/or out from the center of the tank as needed or desired to best handle and concentrate the spent paint materials flowing into the weir box 90. To accomplish this, the baffles 130 and 132 are adjustably mounted as by mounting blocks 134 and 136 to the second weir 82, or alternatively a cross member adjacent to the second weir 82 and extending across the tank, with fasteners (not shown). Of course, the baffles 130 and 132 could be secured by other means or structure.

Figure 5:
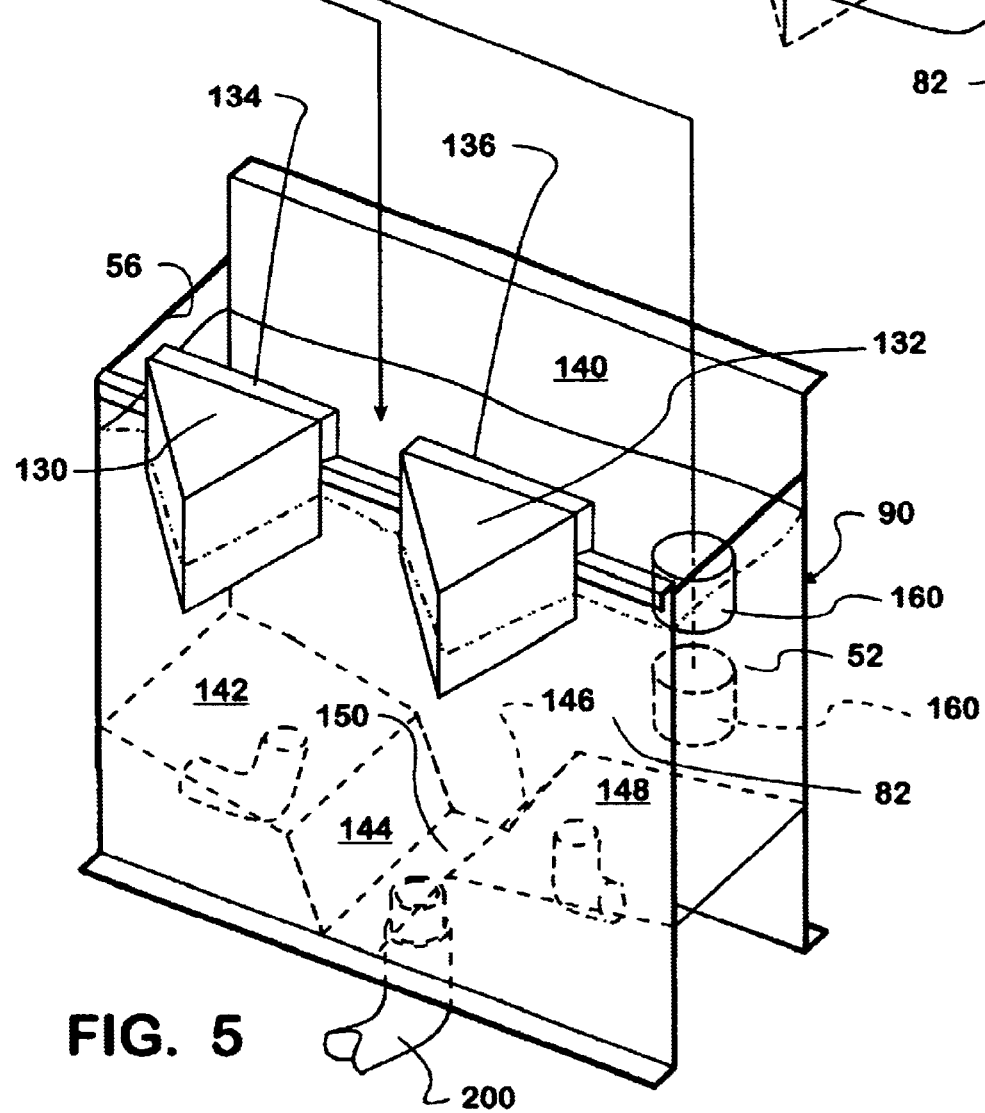
FIG. 5 is an enlarged schematic perspective view of the weir box of the tank of FIG. 2.

As can be seen in FIGS. 2, 3 and 5, the weir box 90 comprises the second baffle 82, forming its upstream wall, a downstream higher wall 140 over which no flow occurs. The sides of the weir box 90 are formed by the sidewalls of the tank. The bottom of the weir box is closed off by a false bottom formed by inclined walls 142, 144, 146, 148 and center flat (horizontal) wall 150. As can be better seen in FIG. 3, cleaner water can flow from section 78 under the weir box 90 into the downstream portion of the tank 40 and downstream of the weir box 90, while the floated spent paint flows over the second weir 82 into the weir box 90.

From the interior of the weir box 90, the spent paint which has already been concentrated by the baffles 130 and 132 is withdrawn or sent to a solids separator in the form of a centrifuge 154 (see FIG. 7), to separate the spent paint material as will be described later. As is depicted in FIG. 3, the cleaner water flows over a third baffle or weir 94 into the pump section 122 of the tank, then passing through screens 96 which protect the pump 100, then into the pump 100 from, where for the most part, it is sent to and reused in the booths.

Referring to FIG. 3, it can be seen when flotation is used, there are three weirs 74, 82 and 94 and crests or the water flow over these weirs are important to proper and efficient operation. If the weirs have insufficient water flow over, i.e., insufficient crest, particularly for weirs 74 and 82, there is a tendency for the spent paint to collect or hang up, interfering with proper separation and operation. If the water flow is too high and the crests too large, excess water is provided and the centrifugal separation becomes more difficult and inefficient.

Heretofore, attempts have been made to control the level of the water in the tank or pit 40, generally with a float controlling a valve discharging make up water into the large chemical treatment section 78. As the volume and surface area of this portion of the tank are large, there has to be very significant or large change in the quantity of water before the float sensed it and could react to control it. In the prior art, when the float sensed a water drop, it caused its associated valve to open and added make up water to the tank. Consequently, there were large variations in the water level.

In the present invention, the water level in the weir box is controlled and this is done using the float 160. When the float 160 senses a water drop (as indicated at 160'), it causes its associated valve 168 (FIG. 5) to open and adds make up water to the weir box 90. It could also be set up to admit water elsewhere into the tank or booth(s).

Figure 6:
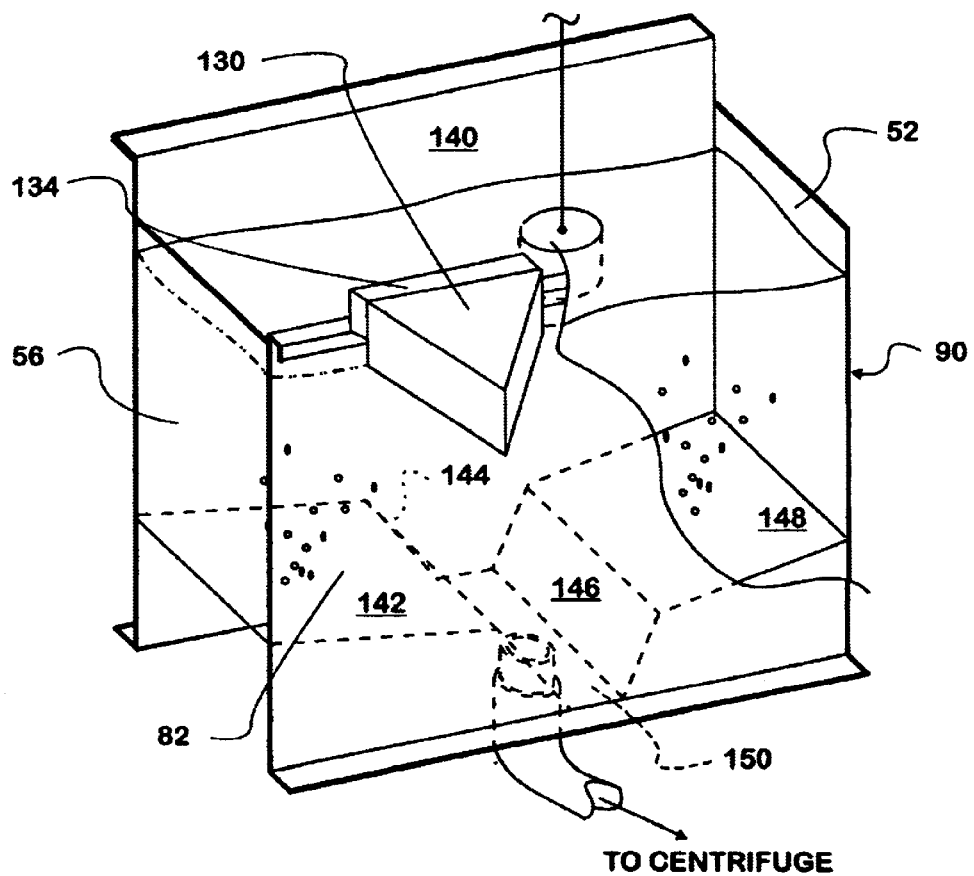
FIG. 6 is a schematic similar to FIG. 5, but showing some alternative means for withdrawing fluid and a preferred float location.

In FIG. 5, the float 160 controlling the make up valve 168 is shown at one side of the weir box 90. In FIG. 6, the preferred arrangement is shown, with the float 160' centrally located. Further as a back up, just in case the float 160 or 160' in the weir box 90 should become stuck, inoperative or fail, say as due to an accumulation of sludge or spent paint, a back up float 170 operating in parallel to the float 160 or 160' to control the valve 168.

Preferably, the float 160, 160' or 170 operates as an electrical switch and the valve 168 is an electrically operated solenoid valve to control the flow of make up water. The float may be a "Mini float" sold by Anchor Scientific, Inc., while the solenoid valve may be like that sold by Osco under Model No. 8210B56. As is shown in FIG. 5, a similar arrangement could be provided for float 160' or 170'. When the float 160 drops, a switch inside the float closes (as is conventional) to provide power to open up the solenoid valve 168 to permit make up water to flow from the pipe 171 to pipe 173 and then into the tank 40, and preferably the weir box section 90 thereof. Of course, the make up flow could be elsewhere into the booth(s) or tank. The back up float 170 is provided in the pump section 12 of the tank 70. Preferably, the back up float 170 may be located before/after the screens 96.

Due to the small volume of the weir box 90, compared to the overall volumes of water in the booths and tank 70, or even any of the other various sections of the tank, the float 160 or 160' in the weir box 90 reacts very quickly to water level changes, and this keeps the water level much more constant and, consequently, the desired crests over the weirs.

The tank 70 is sized according to the booth or booths recirculation rate. Generally, the length of the tank should be several times longer than its width to provide for efficient chemical operation. A good length to width ratio is 5:1 so that there will be at least several minutes time for the chemicals to react with the spent paint. Of course, this will vary with both paint and the chemical treatment. The size of the separator or centrifuge 154 used also is a factor. Generally, the water volume, in gallons, in the weir box should be from 1–½ to somewhat over three times the gallons per minute (gpm) flow rate for the separator or centrifuge. For example, a centrifuge with a flow rate of 20, 40 or 60 gpm might have a weir box with a water volume of 33–66, 66–100 or 100–133 gallons. For example, a system with a 40 gpm centrifuge may have a weir box of about 80 gallons.

In addition to help keep the drop box 70 clean, a scavenging header 180 is provided therein. The header itself is a pipe with a plurality of openings (say 1 inch diameter, 5 inches a part) along its length therein, permitting water to be drawn off via a pipe 182, through a control or butterfly valve 184, to a sludge or trash type or diaphragm pump 186 which is resistant to fouling. From the diaphragm pump 186, the material sucked into the header 180, such as large agglomerating of paint sludge which settles or falls to the bottom of the drop box 70, is discharged through a flexible connector or hose 188, into a basket or strainer 190 located above or in the chemical portion 78 of the tank. The large particles of spent paint is trapped in the basket 190, which may be periodically dumped, and the water flows back into the tank 70 for use.

Additionally in the weir box 90, some of the water and spent paint is drawn off the bottom of the box through a discharge 200 by a pump 202, the discharge 200 and pump 202 inlet being connected by piping 204 and a valve 210. From the pump 202, which is shown in the box 212 in FIG. 1, most of the spent paint and water is delivered (via pipes 201, 203, 205 and 207) to the centrifuge or separator 154. In the separator, the spent paint is separated, and the clarified water returned via pipes 230 and 236 to the tank 40 and drop box section 70. A test outlet 209 closed off selectively by valves to obtain water from the tank or separator is provided.

Further, some of the discharge from the pump 202 can be diverted for agitating the interior of the weir box 90. To this end, the pipe 240 tees into pipe 203 and connects diaphragm valves 244 and 248 to some butterfly nozzles 252 and 254.

By controlling the various valves in the system, and particularly diaphragm valve 244, the rate of flow to the nozzles 252 and 254 agitation in the weir box 90 can be regulated to a desired level. The agitation insures the weir box 90 stays clean without any accumulation and keeps the spent paint there in a suspension to give a more uniform infeed to the centrifuge 220.

When the booth(s) is/are shut down, a maintenance cycle is provided and operated and it has a maintenance header (again, a pipe with a plurality of similar openings therein as for header 180) 260 into which water and any spent paint or trash may be drawn by a pump 264. The maintenance header and pump 264's inlet are connected via pipes 268 and 270. The pump 264 discharges to a pipe 276 which in turn tees into the pipe 205 providing flow to the separator 154. Thus, with the pump 264 in operation during a maintenance period, the drop box may be kept clean by feeding the collected water and materials collected by the header 260 to the separator 154.

Additionally, as shown in FIG. 11, a pipe 282 can be connected to the discharge of the pump 264, and via control valve 288 connected to pipes 292 and 296, which in turn connect to nozzles 300 and 302 in the drop box 90 to provide additional agitation therein, if desired.

While the preferred method and apparatus of the present invention has been described, it should be understood that alternative equivalent steps and elements fall within the scope of the appended claims.

What is claimed is:

1. A method for controlling the water level in a paint spray booth sludge recovery system having said paint spray booth discharging spent paint and water into a sludge tank, the sludge tank having a chemical treatment section, a weir separating the chemical treatment section, a weir box downstream of the weir receiving flow from the weir, a separator withdrawing spent paint and water from the weir box and returning the cleaned water to the spray booth sludge recovery system, and comprising the step of measuring the water level in the weir box and adjusting the water level in the weir box to keep it essentially constant and thus better control the water level over the weir, said step of adjusting including the step of controlling the amount of make up water added to the system over a period of time and further including agitating at least some of the water in the system to keep materials therein in suspension, including the step of scavenging at least portions of the system during downtime to prevent accumulation.

2. A method for controlling the water level in a paint spray booth sludge recovery system having said paint spray booth discharging spent paint and water into a sludge tank, the sludge tank having a chemical treatment section, a weir separating the chemical treatment section, a weir box downstream of the weir receiving flow from the weir, a separator withdrawing spent paint and water from the weir box and returning the cleaned water to the spray booth sludge recovery system, and comprising the step of measuring the water level in the weir box and adjusting the water level in the weir box to keep it essentially constant and thus better control the water level over the weir, the step of adjusting including the step of controlling the rate of make up water being added to the system.

3. A method as in claim 2, the step of returning the cleaned water from the separator to the chemical treatment section and reusing the chemicals therein to treat additional spent paint material.

4. The method of claim 2, wherein the step of measuring includes the step of controlling the level with a float.

5. A method as in claim 2, wherein the step of measuring includes one of mechanically and electrically measuring the water level.

6. The method of claim 2, wherein the step of adjusting includes the step of controlling the rate of water entering the weir box.

7. The method of claim 6, wherein the step of measuring comprises using a float to control the level of water in the weir box.

8. The method of claim 2, including the step of sizing the weir box at least several times smaller in volume than the volume of water held in the chemical treatment section of the sludge recovery system so that any change in water quantity in the system show up quickly as a change in the water level in the weir box.

9. The method of claim 2, further including the step of scavenging the flow of water before it flows into the chemical treatment section of the sludge tank to remove large clumps of spent paint material.

10. The method of claim 2, including the step of agitating the water upstream of the weir box.

11. The method of claim 2, including the step of scavenging at least portions of the tank during downtime to prevent accumulation.

12. The method for controlling the water level in a paint spray booth sludge recovery system having said paint spray booth discharging spent paint and water into a sludge tank, the sludge tank having a chemical treatment section, a weir separating the chemical treatment section, a weir box downstream of the weir receiving flow from the weir, a separator withdrawing spent paint and water from the weir box and returning the cleaned water to the spray booth sludge recovery system, and comprising the step of measuring the water level in the weir box and adjusting the water level in the weir box to keep it essentially constant and thus better control the water level over the weir, wherein the step of adjusting includes the step of controlling the water being added to the tank downstream of the weir box.

13. A method as in claims 12, the step of returning the cleaned water from the separator to the chemical treatment section and reusing the chemicals therein to treat additional spent paint material.

14. The method of claim 12, wherein the step of measuring includes the step of controlling the level with a float.

15. A method as in claim 12, wherein the step of measuring includes one of mechanically and electrically measuring the water level.

16. The method of claim 12, wherein the step of adjusting includes the step of controlling the rate of water entering the weir box.

17. The method of claim 16, wherein the step of measuring comprises using a float to control the level of water in the weir box.

18. The method of claim 12, including the step of sizing the weir box at least several times smaller in volume than the volume of water held in the chemical treatment section of the sludge recovery system so that any change in water quantity in the system show up quickly as a change in the water level in the weir box.

19. The method of claim 12, further including the step agitating the water in the weir box to keep materials therein in suspension.

20. The method of claim 12, further including the step of scavenging the flow of water before it flows into the chemical treatment section of the sludge tank to remove large clumps of spent paint material.

21. The method of claim 12, including the step of agitating the water upstream of the weir box.

22. The method of claim 12, including the step of scavenging at least portions of the tank during downtime to prevent accumulation.

23. The method for controlling the water level in a paint spray booth sludge recovery system having said paint spray booth discharging spent paint and water into a sludge tank, the sludge tank having a chemical treatment section, a weir separating the chemical treatment section, a weir box downstream of the weir receiving flow from the weir, a separator withdrawing spent paint and water from the weir box and returning the cleaned water to the spray booth sludge recovery system, and comprising the step of measuring the water level in the weir box and adjusting the water level in the weir box to keep it essentially constant and thus better control the water level over the weir, further including the step of agitating the water in the weir box to keep materials therein in suspension.

24. A method as in claim 23, the step of returning the cleaned water from the separator to the chemical treatment section and reusing the chemicals therein to treat additional spent paint material.

25. The method of claim 23, wherein the step of measuring includes the step of controlling the level with a float.

26. A method as in claim 23, wherein the step of measuring includes one of mechanically and electronically measuring the water level.

27. The method of claim 23, wherein the step of adjusting includes the step of controlling the rate of water entering the weir box.

28. The method of claim 27, wherein the step of measuring comprises using a float to control the level of water in the weir box.

29. The method of claim 23, including the step of sizing the weir box at least several times smaller in volume than the volume of water held in the chemical treatment section of the sludge recovery system so that any change in water quantity in the system show up quickly as a change in the water level in the weir box.

30. The method of claim 23, further including the step of scavenging the flow of water before it flows in the chemical treatment section of the sludge tank to remove large clumps of spent paint material.

31. The method of claim 23, including the step of agitating the water upstream of the weir box.

32. The method of claim 23, including the step of scavenging at least portions of the tank during downtime to prevent accumulation.

* * * * *

UNITED STATES PATENT AND TRADEMARK OFFICE
CERTIFICATE OF CORRECTION

PATENT NO. : 6,682,654 B1
DATED : January 27, 2004
INVENTOR(S) : Steve E. Telchuk It is certified that error appears in the above-identified patent and that said Letters Patent is hereby corrected as shown below:

<u>Column 8,</u>
Line 38, "claims" should be -- claim --

Signed and Sealed this

Thirteenth Day of April, 2004

JON W. DUDAS
*Acting Director of the United States Patent and Trademark Office*